Jan. 5, 1954  E. F. NORELIUS ET AL  2,664,708
HYDRAULIC CONTROL SYSTEM
Filed March 7, 1950  5 Sheets-Sheet 1

Inventors
Emil F. Norelius
Michael Toth
David Rinkema
by
Attorney

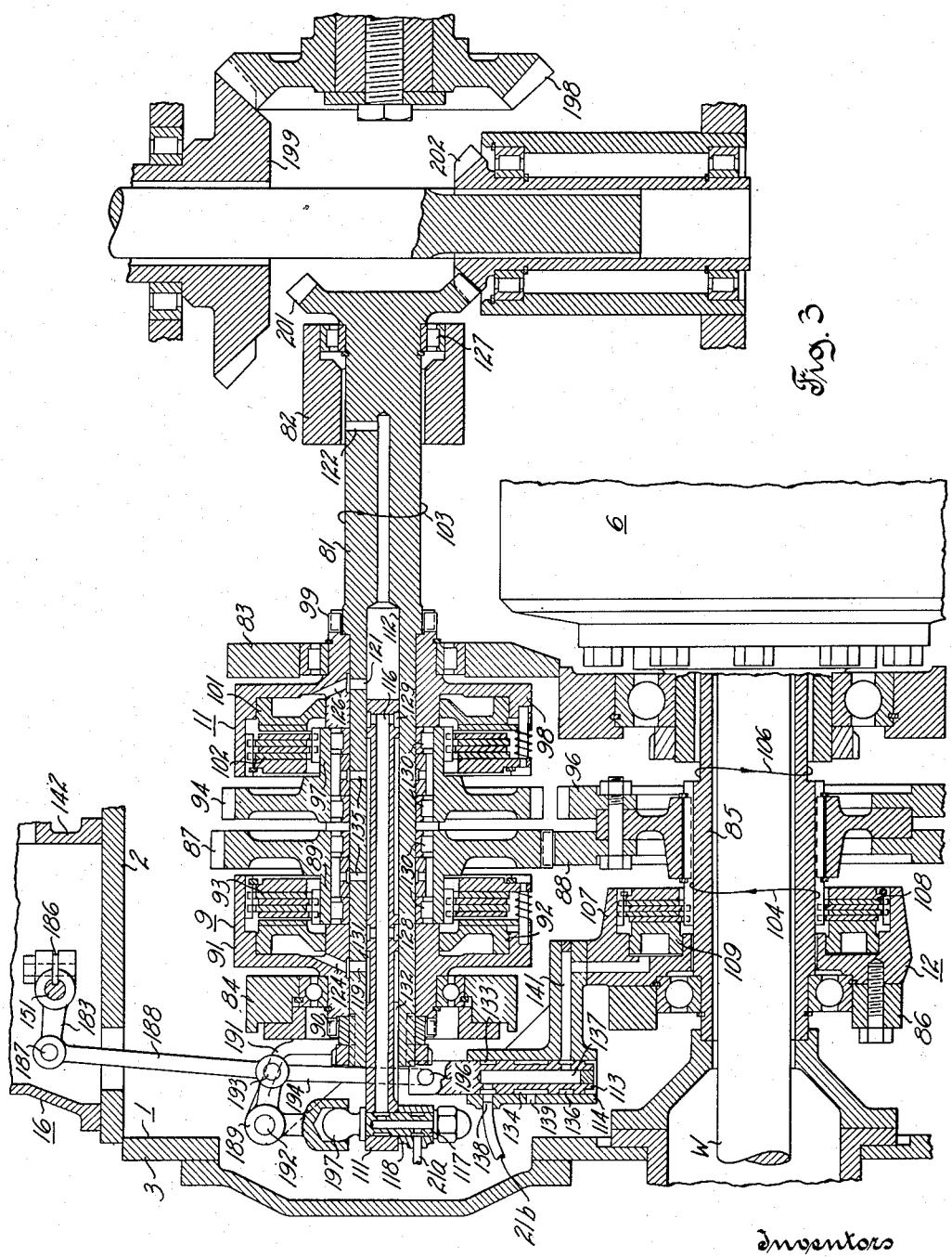

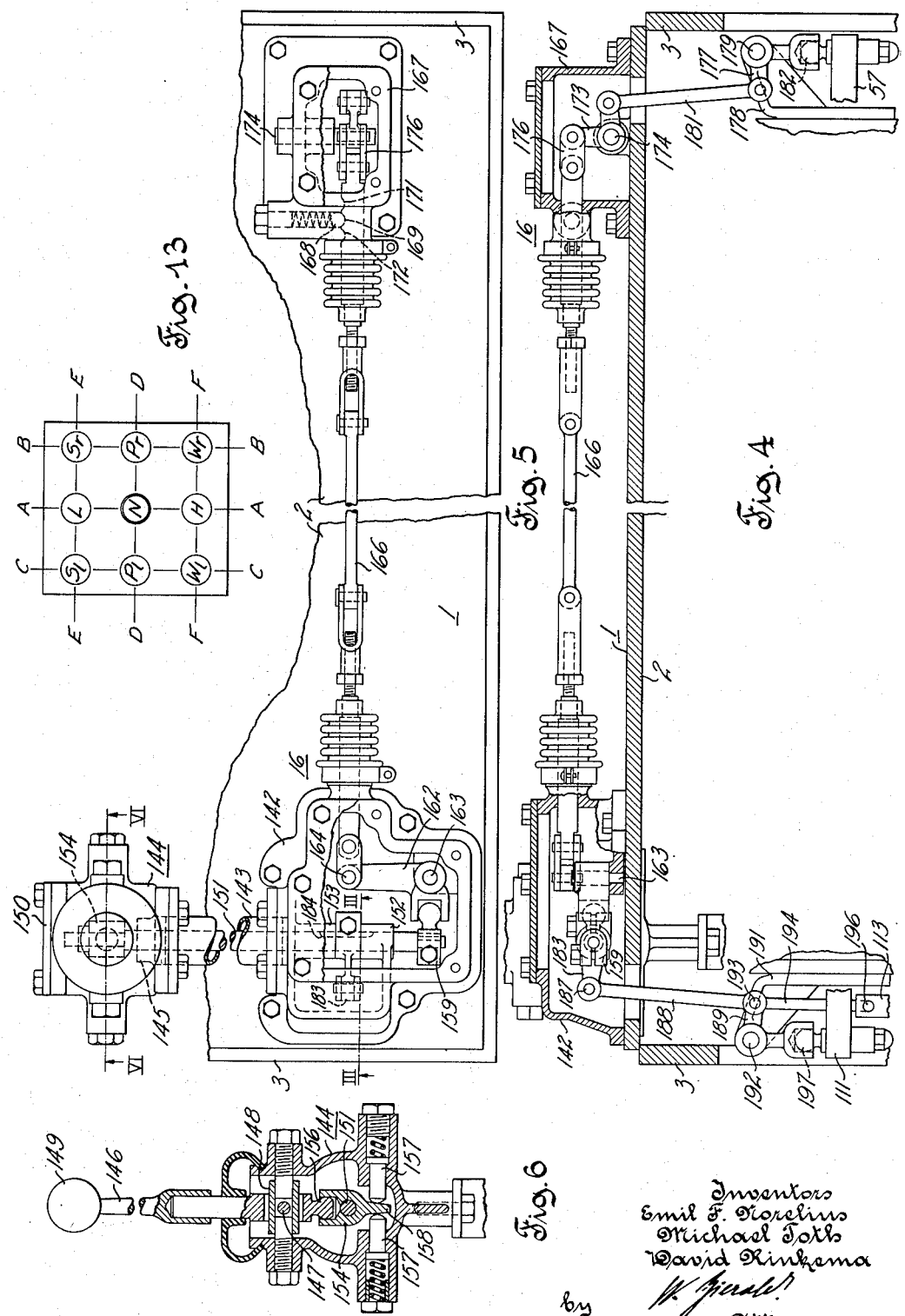

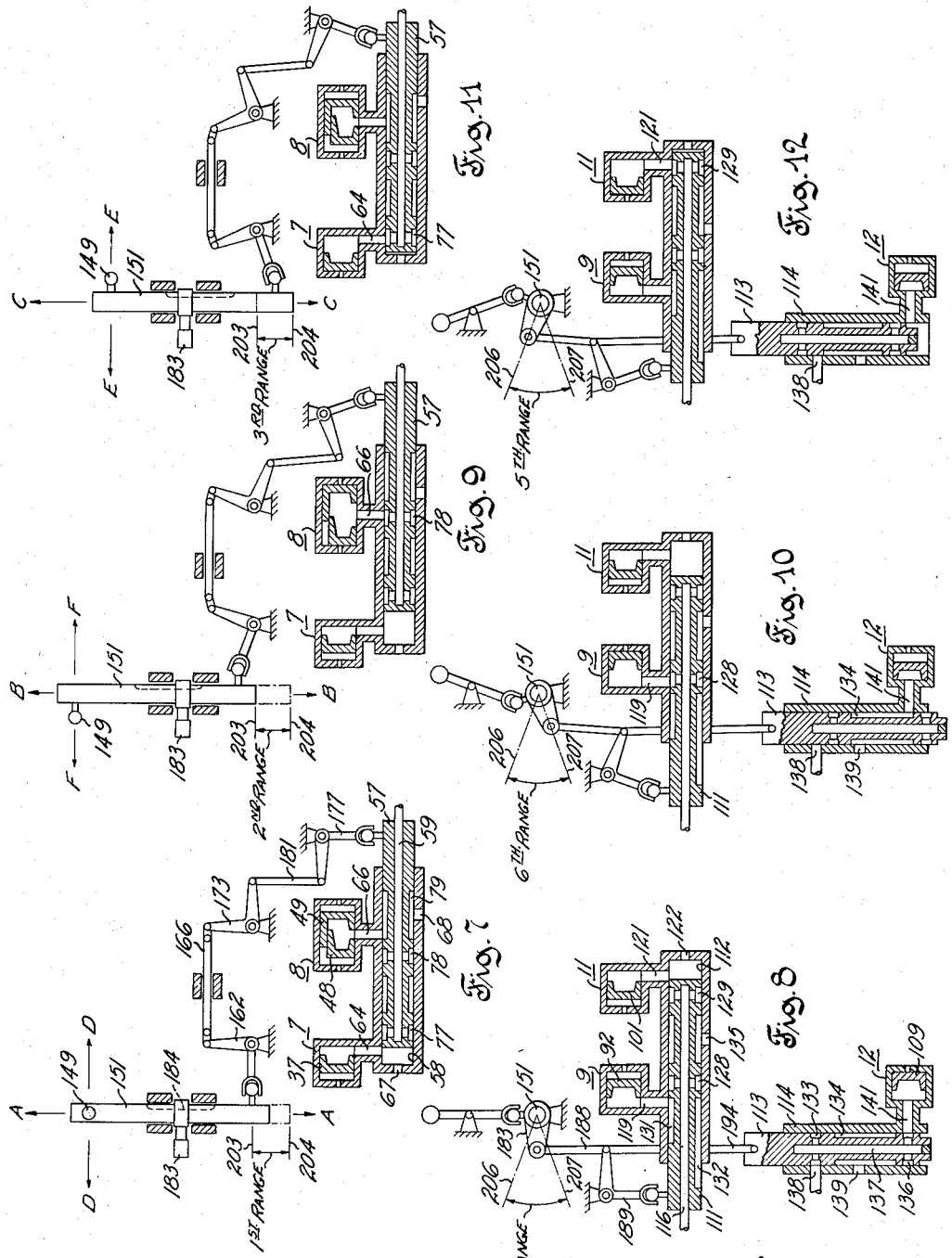

Patented Jan. 5, 1954

2,664,708

UNITED STATES PATENT OFFICE 2,664,708

HYDRAULIC CONTROL SYSTEM

Emil F. Norelius, Michael Toth, and David Rinkema, Springfield, Ill., assignors to Allis-Chalmers Manufacturing Company, Milwaukee, Wis.

Application March 7, 1950, Serial No. 148,147

19 Claims. (Cl. 60—97)

The invention relates to hydraulic systems of the type incorporating a plurality of fluid motors and a mechanism for controlling the fluid motors individually and collectively.

Generally, it is an object of the invention to provide an improved system of the stated character in which the fluid motors are individually and collectively controlled by means of a single control element.

More specifically, it is an object of the invention, to provide a hydraulic system incorporating a fluid motor or a group of fluid motors in one part thereof, another fluid motor or group of fluid motors in another part thereof, and a single control element which may be moved selectively to any one of a first number of adjusted positions to control the fluid motor or motors in said one part of the system independently of the fluid motor or motors in the other part of the system, or to any one of a second number of adjusted positions to control the fluid motor or motors in said other part of the system independently of the fluid motor or motors in said one part of the system, the arrangement being such that any desired operating condition of the fluid motor or motors in said one part of the system and any desired operating condition of the fluid motors in said other part of the system may be established by first moving the control element to its adjusted position affording the desired operating condition of the fluid motor or motors in said one part of the system and by then moving the control element to its adjusted position affording the desired operating condition of the fluid motors in said other part of the system; or by first moving the control element to its adjusted position affording the desired operating condition of the fluid motor or motors in said other part of the system and by then moving the control element to its adjusted position affording the desired operating condition of the fluid motor or motors in said one part of the system.

A further object of the invention is to provide a hydraulic system of the hereinabove outlined character incorporating a valve mechanism which is adjustable selectively to three predetermined operating conditions by translatory movement of the single control element, and another valve mechanism which is adjustable selectively to three predetermined operating conditions by rotary movement of the control element, combined translatory and rotary movement of the control element affording collective control of both valve mechanisms.

A further object of the invention is to provide a hydraulic system incorporating two valve mechanisms, as stated, and two pairs of fluid motors which are controlled, respectively, by the valve mechanisms so that fluid pressure will be emitted from all fluid motors upon adjustment of the valve mechanisms to their first predetermined positions, so that fluid pressure will be admitted alternatively to the fluid motors of one pair upon adjustment of one valve mechanism to its second and third adjusted conditions, respectively, and so that fluid pressure will be admitted alternatively to the fluid motors of the other pair upon adjustment of the other valve mechanism to its second and third adjusted conditions, respectively.

A further object of the invention is to provide a hydraulic system which, in addition to the two pairs of fluid motors as outlined hereinbefore, includes a fifth fluid motor, and in which one of the valve mechanisms controls one pair of fluid motors and also the fifth fluid motor, so that pressure fluid will be admitted to the fifth fluid motor upon adjustment of said one valve mechanism to its first adjusted condition, but will be emitted from the fifth fluid motor upon adjustment of said one valve mechanism to its second and third adjusted conditions.

A hydraulic system incorporating two pairs of fluid motors and a fifth fluid motor as outlined hereinbefore lends itself advantageously to use in connection with a radius controlled steering mechanism such as disclosed, for instance, in application Serial No. 719,062, filed on December 28, 1946, by E. F. Norelius for Controlled Differential Transmission Mechanism, now U. S. Patent 2,533,611, dated December 12, 1950.

A further object of the invention is to adapt a hydraulic system of the general character outlined hereinbefore to use in motor vehicles having a hydraulically controlled power transmitting mechanism enclosed within a housing, and a single control element for the entire hydraulic system mounted on such housing.

Another object of the invention is to provide an improved multiple valve control mechanism incorporating an axially shiftable rock shaft.

These and other objects and advantages are attained by the present invention, various novel features of which will be apparent from the description herein and the accompanying drawings disclosing an embodiment of the invention, and will be more particularly pointed out in the accompanying claims.

In the drawings:

Fig. 3 is an enlarged sectional view of a hydraulically controlled auxiliary gearing shown in the left hand part of Fig. 1, the view being taken on line III—III of Fig. 5.

Fig. 4 is an enlarged sectional rear view of upper parts of the mechanism shown in Fig. 1.

Fig. 5 is a top view, partly fragmentary, of the parts shown in Fig. 4.

Fig. 6 is a sectional view on line VI—VI of Fig. 5.

Figs. 7 through 12 are schematic views illustrating different adjusted conditions of parts shown in Figs. 1 to 6.

Fig. 13 is a diagram illustrating various control positions of a knob at the handle end of a lever shown in Figs. 1 and 6.

Figure 1:
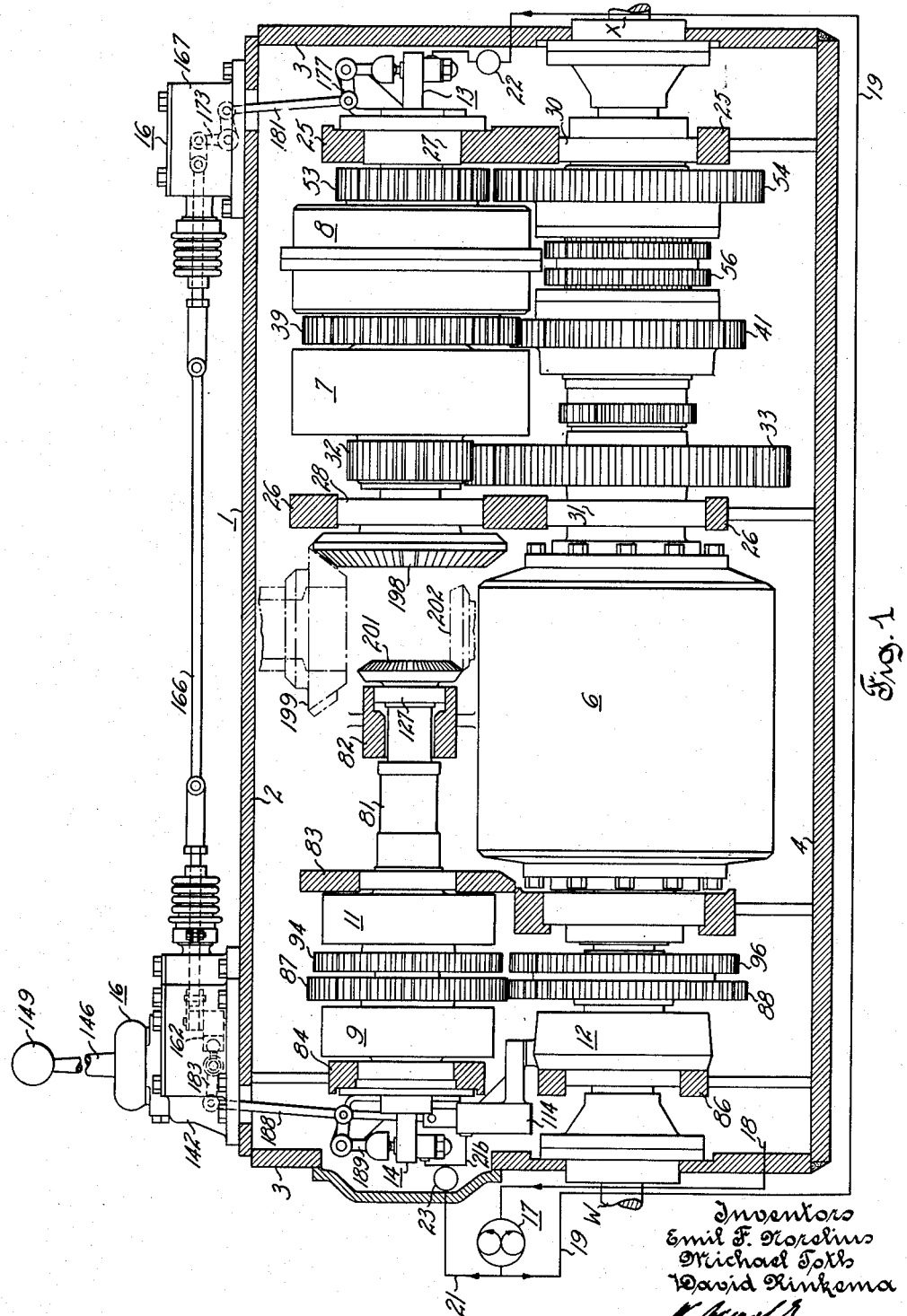
Fig. 1 is a rear view, partly in section and partly in diagrammatic outline, of a hydraulically controlled power transmitting mechanism for motor vehicles.

Referring to Fig. 1, a housing 1 having a generally horizontal top wall 2, opposite vertical side walls 3, 3, a bottom wall 4 and front and rear walls, not shown, encloses three principal units, namely, a controlled differential mechanism at the center, shown in outline and generally designated by the reference character 6, a change speed transmission at the right of the differential, and an auxiliary gearing at the left of the differential. A hydraulic system for controlling these three principal units comprises a hydraulically operable transmission clutch 7, incorporating a first fluid motor, another hydraulically operable transmission clutch 8, incorporating a second fluid motor, a hydraulically operable steering clutch 9, incorporating a third fluid motor, another hydraulically operable steering clutch 11, incorporating a fourth fluid motor, and a hydraulically operable brake 12 incorporating a fifth fluid motor. The hydraulic system further comprises primary valve means, generally indicated at the right of Fig. 1 by the reference character 13 for controlling the fluid motors of the transmission clutches 7 and 8, secondary valve means generally indicated at the left of Fig. 1 by the reference character 14 for controlling the fluid motors of the steering clutches 9, 11 and of the brake 12, and a control mechanism for the primary and secondary valve means 13, 14, generally indicated in the upper part of Fig. 1 by the reference character 16. A gear pump schematically indicated at the left of Fig. 1 by the reference character 17, is connected with a lower part of the housing 1 by an intake conduit 18, and outlet conduits 19 and 21 connect the pump in pressure fluid delivering relation with the primary valve means 13 and with the secondary valve means 14, respectively, as schematically shown in Fig. 1 and as will be explained in greater detail hereinbelow. A relief valve 22 in the outlet conduit 19 is schematically indicated at the right of Fig. 1, and another relief valve 23 in the outlet conduit 21 is schematically indicated at the left of Fig. 1.

Figure 2:
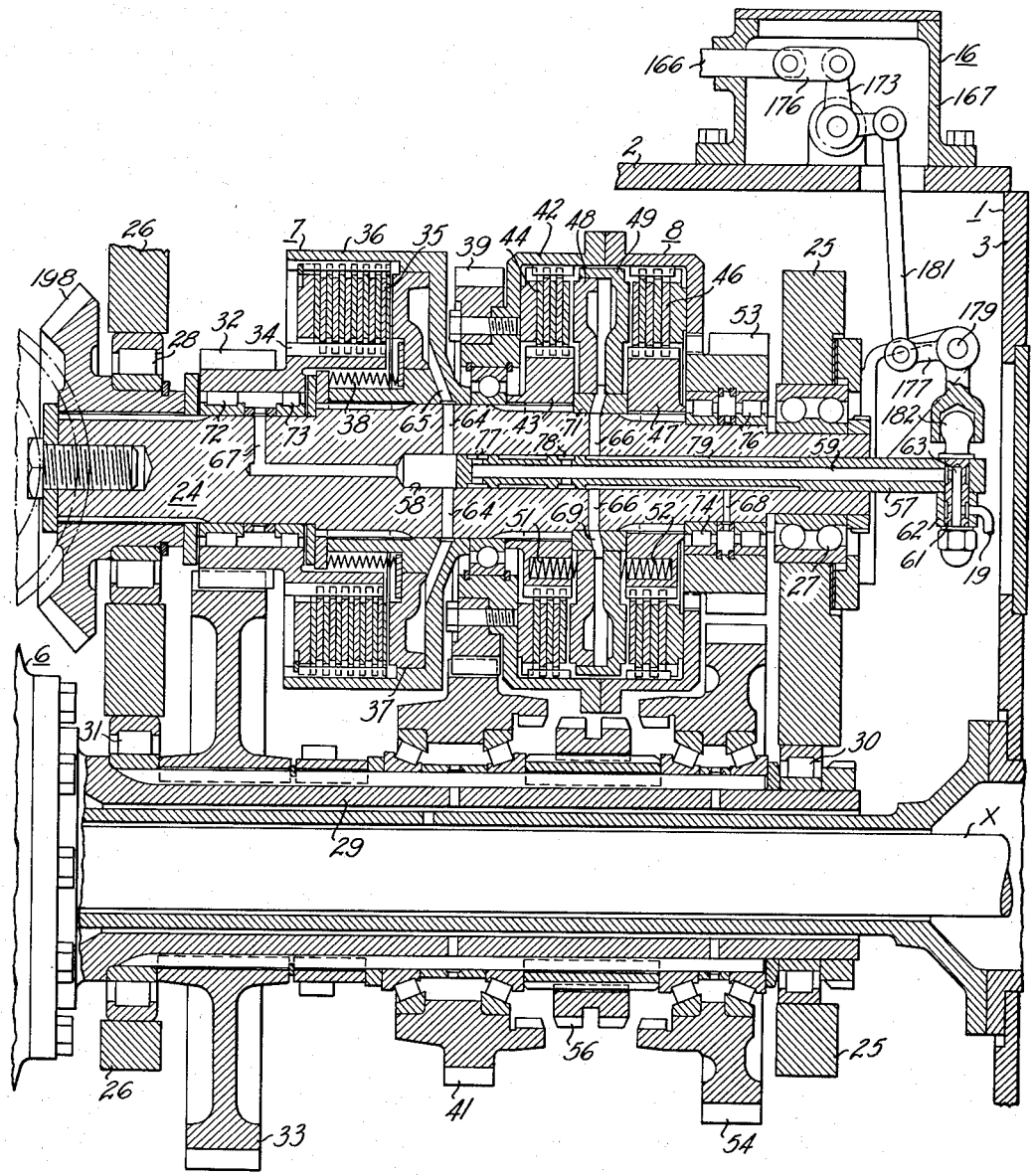
Fig. 2 is an enlarged sectional view of a hydraulically controlled change speed transmission shown in the right hand part of Fig. 1.

Referring to Fig. 2, the change speed transmission comprises an upper shaft 24 which forms the input shaft of the transmission and which is rotatably mounted in suitable internal brackets 25 and 26 of the housing 1 by means of antifriction bearings 27 and 28. A lower shaft 29 which forms the output shaft of the transmission is tubular and rotatably mounted in the brackets 25 and 26 by means of antifriction bearings 30 and 31. The hollow output shaft 29 of the transmission is rigidly secured to the drum or spider structure of the differential 6, as shown at the left of Fig. 2.

A low speed gear train of the change speed transmission comprises a driving gear 32 which is mounted on the input shaft 24 in rotatably loose relation thereto, and a driven gear 33 which is splined on the hollow output shaft 29 and permanently meshes with the driving gear 32. An inner drum 34 of the transmission clutch 7 is integrally formed with the driving gear 32 and is surrounded by an outer drum 36, the outer drum having a central hub part which is splined on the input shaft 24. The mentioned first fluid motor of the hydraulic system comprises an annular piston 37 which is mounted for back and forth movement within an annular recess of the outer drum 36, the piston and annular recess forming in effect a hydraulic jack for compressing a stack of driving and driven clutch disks 35 which are spline connected, respectively, with the inner drum 34 and with the outer drum 36. Compression of the clutch disks establishes a driving connection between the input shaft 24 and the driving gear 32 of the low speed gear train. A circumferential series of coil springs 38 is operatively interposed between a collar on the hub of the outer clutch drum 36 and the piston 37 for urging the latter toward the right and thereby interrupting the driving connection between the outer drum 36 and the inner drum 34 of the clutch 7.

A high speed gear train of the change speed transmission comprises a driving gear 39 which is mounted on the input shaft 24 in rotatively loose relation thereto, and a driven gear 41 which is mounted on the hollow output shaft 29 of the transmission in rotatively loose relation thereto, and which permanently meshes with the driving gear 39. Rigidly secured to the driving gear 39 is an outer drum 42 of the transmission clutch 8, the drum 42 being formed in two sections one of which surrounds an inner drum 43 splined to the input shaft 24. An axially compressible stack of driving and driven clutch disks 44 is operatively interposed between the left hand section of the drum 42 and the inner drum 43. Another stack of axially compressible driving and driven clutch disks 46 is operatively interposed between the right hand section of the outer clutch drum 42 and an inner clutch drum 47 which is keyed to the input shaft 24. The mentioned second fluid motor of the hydraulic system comprises a pair of telescopically interconnected annular pistons 48 and 49 which are mounted in the space between the stack of clutch disks 44 and the stack of clutch disks 46, the pistons 48 and 49 forming in effect a hydraulic jack for compressing both stacks of clutch disks 44 and 46 simultaneously. Such compression of the stacks 44 and 46 establishes a driving connection between the input shaft 24 and the outer drum of the transmission clutch 8. A circumferential series of coil springs 51 is operatively interposed between the inner clutch drum 43 and the piston 48 for urging the piston 48 to the right, and another circumferential series of coil springs 52 is operatively interposed between the inner drum 47 and the piston 49 for urging the piston 49 to the left.

A reverse speed gear train of the change speed transmission comprises a driving gear 53 which is mounted on the input shaft 24 in rotatively loose relation thereto, a driven gear 54 which is mounted on the hollow output shaft 29 and in rotatively loose relation thereto, and an idler gear, not shown, in constant mesh with the driving and driven gears 53 and 54. The driving gear 53 of the reverse speed gear train is connected in driven relation with the right hand section of the outer drum 42 of the transmission clutch 8 by means of interlocking teeth on the outer drum 46 and on the driving gear 53, respectively.

Slidably mounted on the hollow output shaft 29 of the transmission between the driven gear 41 of the high speed gear train, and the driven gear 54 of the reverse speed gear train is a clutch collar 56 which may be shifted by a suitable mechanism, not shown, either into clutching engagement with the driven gear 41 of the high speed gear train or into clutching engagement with the driven gear 54 of the reverse speed gear train.

In order to establish the high speed driving connection between the input shaft 24 and the output shaft 29, the clutch collar 56 is first moved into clutching engagement with the driven gear 41 of the high speed gear train, and the outer drum of the transmission clutch 8 is then coupled to the input shaft 24 by admission of fluid pressure into the space between the pistons 48 and 49. Rotation of the input shaft 24 will then be transmitted simultaneously to the driving gears of the high speed gear train and of the reverse speed gear train, and the driven gear 54 of the reverse speed gear train will rotate idly on the output shaft 29.

On the other hand, if it is desired to operate the transmission in reverse gear, the clutch collar 56 is first moved into clutching engagement with the driving gear 54 of the reverse speed gear train, and subsequent admission of pressure fluid into the space between the pistons 48 and 49 will then couple the outer drum 42 of the transmission clutch 8 to the input shaft 24 so that rotation of the input shaft 24 will be transmitted to the output shaft 29 through the reverse speed gear train 53, 54 while the driven gear 41 of the high speed gear train rotates idly on the output shaft 29.

The primary valve means 13, which have been mentioned hereinbefore, comprise a hollow piston 57, shown in Fig. 2, which is reciprocably mounted in an axial bore 58 of the transmission input shaft 24 in rotatable relation thereto so that the shaft 24 may rotate without rotating the piston 57. An axial internal passage 59 of the piston 57 communicates with the outlet conduit 19 of the pump 17 as shown at the right of Fig. 2. That is, mounted in a transverse bore of the piston 57 is a pin 61 which has two circumferential grooves, an upper one communicating with the axial passage 59 of the piston 57 and a lower one which is surrounded by a collar 62. A flexible end section of the conduit 19 is secured to a bore in the collar 62 which communicates with the lower circumferential groove of the pin 61, and pressure fluid issuing from the conduit 19 into the lower groove may pass from the latter through a radial bore of the pin 61 into an axial bore 63 of the pin, and from the axial bore 63 the pressure fluid may pass through another radial bore of the pin into the upper circumferential groove and from the latter into the axial passage 59 of the piston 57.

The axial bore 58 of the shaft 24 in which the piston 57 is mounted communicates with axially spaced radial bores 64 and 66 of the shaft 24, and also with an auxiliary radial bore 67 at the left of the radial bore 64 and with another auxiliary radial bore 68 at the right of the radial bore 66. The radial bore 64 communicates at its opposite ends with oblique bores 65 of the outer clutch drum 36 leading into the annular space at the right of the piston 37, and the radial bore 66 communicates at its opposite ends with oblique bores 69 of a collar 71 on which the pistons 48 and 49 are reciprocably mounted, the oblique bores 69 communicating with the space between the pistons 48 and 49. The auxiliary radial bore 67 has an outlet port between roller bearings 72 and 73 for the gear 32, and the other auxiliary radial bore 68 has an outlet port between roller bearings 74 and 76 for the gear 53.

The construction of the valve piston 57 is such as to control the admission of pressure fluid to and the emission of pressure fluid from the radial bores 64 and 66. Figs. 2 and 7 show the primary valve means in a first adjusted condition, and it will be noted that in this condition of the primary valve means pressure fluid entering the axial passage 59 of the piston 57 may pass into an annular recess 77 and into another annular recess 78 of the piston but may not freely pass from any of these annular recesses into any of the radial bores 64 and 66. It will further be noted that in the first adjusted condition of the primary valve means, as shown in Figs. 2 and 7, the hydraulic jack of the transmission clutch 7 will be vented through the oblique bores 65, radial bore 64, axial bore 58, and radial bore 67 which, in turn, communicates through the gaps of the roller bearing 72 with the interior of the transmission housing 1, and that the hydraulic jack of the transmission clutch 8 will be vented through the oblique bores 69, radial bore 66, a long annular recess 79 of the valve piston 57 and radial bore 68 which, in turn, communicates through the gaps of the roller bearing 76 with the interior of the transmission housing 1. Axial movement of the valve piston 57 to the left, in Fig. 2, will bring the annular recess 77 of the piston 57 into communication with the radial bore 64 of the shaft 24 and thereby establish a second adjusted condition of the primary valve means, as schematically indicated in Fig. 11, which permits admission of pressure fluid to the hydraulic jack of the transmission clutch 7 and emission of pressure fluid from the hydraulic jack of the transmission clutch 8. On the other hand, axial movement of the piston 57 to the right, in Fig. 2, will bring the annular recess 78 of the piston 57 into communication with the radial bore 66 of the shaft 24 and thereby establish a third adjusted condition of the primary valve means, as schematically indicated in Fig. 9, which permits admission of pressure fluid to the hydraulic jack of the transmission clutch 8 and emission of pressure fluid from the hydraulic jack of the transmission clutch 7.

The mentioned adjustments of the piston 57 may be effected by means of a mechanism, part of which is shown at the right of Fig. 2 and which will be explained more fully hereinbelow.

Referring to Fig. 3, the auxiliary gearing which, as shown in Fig. 1, is arranged at the left of the differential 6, comprises an upper or driving shaft 81 which is rotatably mounted in internal brackets 82, 83 and 84 of the housing 1, and a lower tubular driven shaft 85 which is rotatably mounted at the left in an internal bracket 86 of the housing 1 and which extends to the right into the housing or spider of the differential 6 in which it is suitably supported for rotation relative thereto. A driving gear 87 is mounted on the shaft 81 in rotatable relation thereto, and a cluster gear which is splined on the tubular shaft 85 has a gear section 88 in constant mesh with the driving gear 87. An inner drum 89 of the steering clutch 9 is integrally formed with the driving gear 87 and is surrounded by an outer drum 91 which is connected by a jaw coupling 90 at the left with the driving shaft 81 for rotation in unison therewith.

The mentioned third fluid motor of the hydraulic system comprises an annular piston 92 which is reciprocably mounted in an annular recess of the clutch drum 91, the piston 92 and the annular recess of the drum 91 forming a hydraulic jack for compressing a stack of driving and driven clutch disks 93 which are operatively interposed between the outer and inner drums 91 and 89 of the steering clutch 9. Compression of the disk stack 93 locks the gear 87 to the shaft 81 for rotation in unison therewith, and as a result establishes a driving connection between the driving shaft 81 and the driven shaft 85.

Another driving gear 94 is mounted on the shaft 81 in rotatable relation thereto and an idler gear, not shown, is arranged in constant mesh with the driving gear 94 and a gear section 96 of the cluster gear on the driven shaft 85. An inner drum 97 of the steering clutch 11 is integrally formed with the driving gear 94 and is surrounded by an outer drum 98 which is connected by a jaw coupling 99 with the driving shaft 81 for rotation in unison therewith.

The mentioned fourth fluid motor of the hydraulic system comprises an annular piston 101 which is reciprocably mounted in an annular recess of the clutch drum 98, the piston 101 and the annular recess of the clutch drum 98 forming a hydraulic jack for compressing a stack of driving and driven clutch disks 102 which are operatively interposed between the outer and inner drums 98 and 97, respectively. Compression of the disk stack 102 locks the gear 94 to the shaft 81 for rotation in unison therewith and as a result establishes another driving connection between the shaft 81 and the driven shaft 85 through the gears 94, 96 and the idler, not shown.

If the shaft 81 is rotated in one direction as indicated by the arrow 103, in Fig. 3, establishment of a driving connection through the gears 87, 88 by compression of the disk stack 93 will cause rotation of the driven shaft 85 in the direction of arrow 104, and establishment of the other driving connection by compression of the disk stack 102 will cause rotation of the shaft 85 in the direction of arrow 106 in Fig. 3.

A brake mechanism for securing the shaft 85 against rotation when both of the driving connections between the shaft 81 and the shaft 85 are interrupted comprises an outer drum 107 which is rigidly secured to the bracket 86, and an axially compressible stack of friction disks 108 which are spline connected, respectively, with the drum 107 and with the shaft 85.

The mentioned fifth fluid motor of the hydraulic system comprises an annular piston 109 which is reciprocably mounted in an annular recess of the drum 107, the piston 109 and the annular recess of the drum 107 forming a hydraulic jack for compressing the stack of friction disks 108.

The secondary valve means 14 which have been mentioned hereinbefore comprise a hollow piston 111, shown in Fig. 3, which is reciprocably mounted in an axial bore 112 of the driving shaft 81 in rotatable relation thereto so that the shaft 81 may rotate without rotating the valve piston 111. The secondary valve means further comprise a reciprocably adjustable piston 113 within a valve housing 114, as shown at the left in Fig. 3.

An axial internal passage 116 of the piston 111 communicates with a branch 21a of the outlet conduit 21 of the pump 17, as shown at the left of Fig. 3. The detail construction of the connection between the branch 21a and the axial passage 116 is similar to the detail construction of the connection between the outlet conduit 19 and the valve piston 57 which has been explained hereinbefore. That is, a pin 117 corresponding with the pin 61 is mounted in a transverse bore of the piston 111 and has two annular grooves, an axial bore and radial passages for admitting pressure fluid to the axial passage 116 of the piston 111 from a flexible end section of the conduit branch 21a which is secured to a collar 118 corresponding to the collar 62.

The axial bore 112 of the shaft 81 in which the piston 111 is mounted communicates with axially spaced radial bores 119 and 121, and also with an auxiliary radial bore 122 near the right end of the shaft 81. The radial bore 119 communicates with an oblique bore 124 of the clutch drum 91 leading into the annular space at the left of the piston 92, and the radial bore 121 communicates with an oblique bore 126 of the drum 98 leading into an annular space at the right of the piston 101. The auxiliary radial bore 122 has an outlet port within the bracket 82, so that oil issuing from the auxiliary bore 122 may pass to a roller bearing 127 for the shaft 81.

The construction of the valve piston 111 is such as to control the admission of pressure fluid to and the emission of pressure fluid from the radial bores 119 and 121. Figs. 3 and 8 show the secondary valve means in a first adjusted condition, and it will be noted that in this condition of the secondary valve means pressure fluid entering the axial passage 116 of the piston 111 may pass into an annular recess 128 and into another annular recess 129 of the piston but may not freely pass from any of these annular recesses into any of the radial bores 119 and 121. It will further be noted that in the first adjusted condition of the secondary valve means, as shown in Figs. 3 and 8, the radial bore 119 communicates with an elongated annular recess 131 of the piston 111, which in turn communicates through an axial outer groove 132 of the piston with the interior of the housing 1. Accordingly, in the position of the piston 111, as shown in Figs. 3 and 8, the hydraulic jack of the steering clutch 9 will be vented. It will further be noted that in the adjusted condition of the piston 111, as shown in Figs. 3 and 8, the radial bore 121 communicates with the auxiliary bore 122 so that the hydraulic jack of the steering clutch 111 will also be vented.

Axial movement of the piston 111 to the left in Fig. 3 will bring the annular recess 128 of the piston 111 into communication with the radial bore 119 and thereby establish a second adjusted condition of the piston 119, schematically indicated in Fig. 10, which permits admission of pressure fluid to the hydraulic jack of the steering clutch 9 and emission of pressure fluid from the hydraulic jack of the steering clutch 111. On the other hand, axial movement of the piston 111 to the right, in Fig. 3, will bring the annular recess 129 of the piston 111 into communication with the radial bore 121 of the shaft 81 and thereby establish an adjusted condition of the piston 111, as schematically indicated in Fig. 12, which permits admission of pressure fluid to the hydraulic jack of the steering clutch 11 and emission of pressure fluid from the hydraulic jack of the steering clutch 9.

The driving gears 87 and 94 are rotatably supported on the shaft 81 by means of roller bearings 130, as shown in Fig. 3, and pressure oil leaking from the recesses 128, 129 of the piston 111 may pass through radial bores 135 of the shaft 81 in order to lubricate these bearings. In Fig. 2, the roller bearings 72, 73 for the low speed driving gear 32, and the roller bearings 74, 76 for the driving gear 53 are similarly lubricated by pressure oil leaking from the annular recesses 77 and 78 of the piston 57.

The piston 113 of the secondary valve means is reciprocably mounted in a vertical bore of the valve housing 114 and has an upper annular recess 133, an axially elongated intermediate annular recess 134 and a lower annular recess 136. An axial internal passage 137 of the piston 113 communicates at its upper end with the annular recess 133 and at its lower end with the annular recess 136, the axial internal passage 137 being closed at its upper and lower ends, as shown in Fig. 3. The vertical bore of the valve housing 114 communicates with an upper radial bore 138, with an intermediate radial bore 139, and with an angular passage 141 leading into the space at the left of the piston 109. The outlet conduit 21 of the pump 17 has a branch 21b, and a flexible end section of the branch 21b is connected with the upper radial bore of the valve housing 114.

In the first adjusted condition of the secondary valve means, as shown in Figs. 3 and 8, pressure fluid issuing from the branch conduit 21b may pass into the upper annular recess 133 of the piston 113 and from the latter through the axial internal passage 137, the lower annular recess 136 and the angular passage 141 into the space at the left of the piston 109, so that the shaft 85 will be restrained against rotation by compression of the friction disks 108. Axial downward movement of the piston 113 from the position in which it is shown in Figs. 3 and 8 will close the radial bore 138 and bring the intermediate annular recess 134 of the piston 113 into communication with the angular passage 141 and thereby establish a second adjusted condition of piston 113, as schematically indicated in Fig. 10, which permits emission of pressure fluid from the hydraulic jack for the brake mechanism 12, with the result that the shaft 85 will be released for rotation. On the other hand, upward adjustment of the piston 113 from the position in which it is shown in Fig. 3 will again close the radial bore 138 and connect the angular passage 141 with the open lower end of the valve housing 114 and thereby establish a third adjusted condition of the piston 113, as schematically indicated in Fig. 12, which permits emission of pressure fluid from the hydraulic jack of the brake mechanism 12 so that the shaft 85 will be released for rotation.

The mentioned adjustments of the pistons 111 and 113 are effected in predetermined relation to each other by means of a link and lever system, shown at the left in Fig. 3, and which forms part of the control mechanism for the hydraulic system, generally indicated in Fig. 1 by the reference character 16.

The control mechanism 16 as a whole is shown in Figs. 4 and 5, and the construction of this mechanism is as follows. An auxiliary housing 142 is mounted on top of the housing 1 at the left side of the latter and has a tubular extension 143 (Fig. 5), the free end of which mounts a tower 144 for a hand lever 146. Referring to Fig. 6, the hand lever 146 is mounted on the tower 144 for universal movement about a fixed pivot center at 147 by means of a gimbal joint 148, and has a handle knob 149 at its upper end. A shaft 151 extending through the tubular extension 143 of the housing 142 is mounted on a horizontal axis below the pivot center 147 within axially spaced bearing lugs 152 and 153 of the auxiliary housing 142 and within a bearing 145 of the tower 144. The mounting of the shaft 151 within the brackets 145, 152 and 153 is such as to permit back and forth shifting movement of the shaft 151 in the direction of its axis and also rotary movement of the shaft 151 on said axis. In other words, the shaft 151 represents an axially shiftable rock shaft, and this rock shaft forms a single control element for the primary and secondary valve means which have been explained in detail hereinbefore.

Rigidly mounted on the forward end of the shaft 151 within the tower 144 is a socket block 154 for the reception of a ball head 156 at the lower end of the hand lever 146, the socket block and ball head cooperating to form a universal connection between the hand lever 146 and the rock shaft 151. Spring pressed plungers 157 are urged in opposite directions against a depending web 158 of the socket 154 and normally retain the socket block 154 and hand lever 146 in the vertical position in which they are shown in Fig. 6. The web 158 is elongated in the axial direction of the rock shaft 151 so that the plungers 157 will remain in contact with the web 158 when the rock shaft is shifted axially back and forth by swinging movement of the hand lever 146 about the pivot center at 147 in the longitudinal direction of the shaft 151. The shaft 151 has an axial extension at its forward end, as shown in Fig. 5, and the tower 144 has a front wall 150 which is abuttable by the forward extension of the shaft 151 upon forward shifting movement of the latter from the position in which it is shown in Fig. 5, in order to limit such forward shifting movement of the shaft 151. Rearward shifting movement of the rock shaft 151 from the position in which it is shown in Fig. 5 is limited by engagement of the socket block 154 with the bearing 145.

Swinging movement of the hand lever 146 to the right or left in Fig. 6 about its pivot center at 147 rocks the shaft 151 about its axis, and such rocking movement of the shaft 151 is limited by restricted travel of the plungers 157 within the tower 144. The plungers 157, being spring mounted, automatically return the hand lever 146 from its laterally inclined positions to the central position in which it is shown in Fig. 6, when the operator relaxes the lateral push on the handle knob 149.

Referring to Fig. 5, the shaft 151 has an axially extending stud at its rear end within the housing 142, and a ball head lever 159 is secured at the axially outer side of the bearing lug 152 to the stud end of the shaft 151 in axially and rotatively fixed relation thereto. That is, the ball head lever 159 has a split hub which is clamped upon the stud end of the shaft 151 by means of a bolt extending transversely of the shaft and engaging a lateral recess of the stud end to secure the ball head in axially fixed position on the shaft 151. A key and slot connection between the stud end of the shaft 151 and the hub of the ball head lever 159 secures the ball head lever against rotation relative to the shaft 151.

A first rocker 162 is pivotally mounted within the housing 142 on an axis indicated at 163 which extends transversely of and is spaced from the axis of the rock shaft 151. The rocker 162 has a bifurcated laterally extending arm in cooperative engagement with the ball head of the lever 159, plane vertical surfaces being formed on the bifurcated arm of the rocker 162 to provide a vertical slot in which the ball head of the lever 159 is movable up and down when the shaft 151 is rocked on its axis in opposite directions from the circumferentially adjusted position in which it is shown in Fig. 6.

A forwardly extending arm of the rocker 162 is link connected, as indicated at 164 with a reciprocable link 166 which extends transversely of the housing 1 above the top wall 2 of the latter and which is slidably supported at its left end within the auxiliary housing 142. The right end of the link 166 is slidably supported in another auxiliary housing 167 which is mounted on top of the housing 1 at the right side of the latter. A ball detent 168 is mounted within the auxiliary housing 167 for cooperation with three notches 169, 171 and 172 of the link 166. In the position of the parts, as shown in Fig. 5, the ball detent 168 engages the notch 169 and thus determines the first axially adjusted position of the rock shaft 151, as schematically indicated in Fig. 7. Axial movement of the rock shaft 151 from the position in which it is shown in Fig. 5 in a rearward direction brings the notch 171 into engagement with the ball detent 168 and such engagement determines a second axially adjusted position of the rock shaft 151, as schematically indicated in Fig. 11. On the other hand, axial adjustment of the rock shaft 151 from the position in which it is shown in Fig. 5 in a forward direction brings the notch 172 into engagement with the ball detent 168, and such engagement determines a third axially adjusted position of the rock shaft 151, as schematically indicated in Fig. 9.

A second rocker 173 (Fig. 4) is mounted within the auxiliary housing 167 for pivotal movement on an axis indicated at 174, which extends transversely of the pivot axis of the first rocker 162, and an upwardly extending arm of the second rocker 173 is link connected at 176 with the right end of the link 166.

Referring to Fig. 4, a third rocker 177 is pivotally mounted within the housing on a stationary bracket 178 for pivotal movement on an axis indicated at 179, which extends parallel to the pivot axis of the second rocker 173. The third rocker 177 has a laterally extending arm which is operatively connected by a link 181 with a laterally extending arm of the second rocker 173, the link 181 extending through a suitable aperture in the top wall 2 of the housing 1. A downwardly extending arm of third rocker 177 has a socket in cooperative engagement with a ball head 182 on the pin 61 of the valve piston 57. The ball head lever 159, rocker 162, link 166, rocker 173, link 181 and rocker 177 represent first actuating means which connect the control element 151 with the primary valve means 13, and which are operative to actuate the latter upon back and forth axial shifting movement of the control element, as schematically indicated in Figs. 7, 9 and 11, and such first actuating means are inoperative to actuate said primary valve means upon rotary movement of the shaft 151 within the brackets 145, 152 and 153.

Referring to Fig. 5 and the upper part of Fig. 3 which shows a section on line III—III of Fig. 5, an arm 183 is mounted on the rock shaft 151 in the space between the axially inner sides of the bearing lugs 152 and 153 in nonrotatable and axially slidable relation to the shaft 151. That is, the shaft 151 has an elongated axial groove 184 for the reception of a key 186 which is rigidly secured to a split hub of the arm 183, the groove 184 and the key 186 being effective to transmit rotary movement of the shaft 151 to the arm 183 and permitting axial movement of the shaft 151 relative to the arm 183 when the rock shaft is shifted back and forth axially as has been explained hereinbefore. The brackets 152 and 153 within the auxiliary housing 142 serve as abutments to restrain back and forth movement of the arm 183 relative to the housing 142 in the axial direction of the shaft 151.

Pivoted to the free end of the arm 183, at 187 is a link 188 which extends downwardly into the housing 1 through an opening in the top wall 2 of the latter, as shown in Figs. 3 and 4.

A fourth rocker 189 is pivotally mounted within the housing 1 on a stationary bracket 191 for pivotal movement on an axis 192 extending parallel to the axis of the rock shaft 151. The fourth rocker 189 has a laterally extending arm to which the lower end of the link 188 is pivotally connected at 193. Also pivotally connected to the fourth rocker 189 at 193 is the upper end of a link 194 whose lower end is pivotally connected at 196 to the upper end of the valve piston 113. A downwardly extending arm of the rocker 189 has a socket which operatively engages a ball head 197 of the pin 117 on the valve piston 111.

In the position of the parts as shown in Figs. 4 and 8, the rock shaft 151 is adjusted to a first rotatively adjusted position from which it may be moved by rotation in anticlockwise direction to a second rotatively adjusted position, as schematically indicated in Fig. 10. On the other hand, the rock shaft 151 may be adjusted to a third rotatively adjusted position, as schematically indicated in Fig. 12, by clockwise rotation from the position in which it is shown in Figs. 4 and 8.

The radial distance between the pivot axes 192 and 193 on the fourth rocker 189, and the effective length of the link 194 between the pivot axes 193 and 196 are so proportioned that the piston 111 and the piston 113 will be shifted in predetermined relation to each other upon pivotal movement of the rocker 189 about its pivot axis 192. That is, in the first rotatively adjusted position of the rock shaft 151, as shown in Figs. 4 and 6, and as schematically indicated in Fig. 8, the piston 111 occupies the position in which it permits emission of pressure fluid from the hydraulic jacks of the steering clutches 9 and 11, as has been explained hereinbefore, and the piston 113 occupies the position in which it permits admission of fluid pressure to the hydraulic jack of the brake mechanism 12, as has been explained hereinbefore.

Rotary adjustment of the rock shaft 151 to its second rotatively adjusted position, as schematically indicated in Fig. 10, moves the piston 111 to a position which permits admission of fluid pressure to the hydraulic jack of the steering clutch 9 and emission of fluid pressure from the hydraulic jack of the steering clutch 11. The proportioning of the distance between the pivot axes 192 and 193 on the rocker 189 and of the effective length of the link 194 is such that movement of the rock shaft to its second rotatively adjusted position in which it is shown in Fig. 10 lowers the piston 113 to a position in which it closes the port 138 of the valve housing 114 and in which it permits emission of pressure fluid from the hydraulic jack of the brake mechanism 12 through the port 139 of the valve housing 114. Further, if the rock shaft 151 is moved to its third rotatively adjusted position in which it is shown in Fig. 12, the piston 113 is raised to a position in which it again closes the inlet port 138 of the valve housing 114, and in which it permits emission of fluid pressure from the hydraulic jack of the brake mechanism 12 through the open lower end of the valve housing 114, as schematically indicated in Fig. 12.

As stated hereinbefore, the rock shaft 151 is universally connected by the socket block 154 and ball head 156 with the hand lever 146, and the mentioned shifting and rotation of the rock shaft 151 is effected by manipulation of the hand lever 146. Referring to the diagram of Fig. 13, the reference character N designates the position which the knob 149 occupies when the mechanism is adjusted to the condition illustrated by Figs. 6, 7 and 8. That is, the position N in Fig. 13 indicates a neutral position of the hand lever 146 in which the transmission clutches 7 and 8 and the steering clutches 9 and 11 are disengaged and in which the brake mechanism 12 is engaged. As shown in Figs. 1 and 2, a bevel gear 198 is secured to the transmission input shaft 24 at the left end of the latter, and as shown in Fig. 1, a complementary power driven bevel gear 199 has a constant mesh driving connection with the bevel gear 198. The driving shaft 81 of the auxiliary gearing has another bevel gear 201 which has a constant mesh driving connection with a power driven bevel gear 202. A suitable mechanism, not shown, is connected with the bevel gears 199 and 202 for simultaneously supplying driving power to the bevel gears 199 and 202. The gear pump 17, shown in Fig. 1, is driven by a suitable mechanism, not shown, to furnish a constant supply of fluid pressure.

In the neutral condition of the mechanism which is established by adjustment of the hand lever 146 to the position N in Fig. 13, no driving power will be transmitted to the output shaft 29 of the transmission or to the driven shaft 85 of the auxiliary gearing while the bevel gears 199 and 202 are rotating, and the output shaft 85 of the auxiliary gearing will be restrained against rotation by operation of the brake mechanism 12.

From the position N in Fig. 13, the hand lever 146 may be moved forwardly in the direction of line A—A to the position indicated by the reference character L in Fig. 13. Adjustment of the lever 146 to the position L causes axial rearward shifting movement of the rock shaft 151 to the position indicated in Fig. 11 which causes engagement of the low speed transmission clutch 7 and therefore transmission of power from the input shaft 24 of the transmission to the drum or spider of the differential mechanism 6 through the low speed gear train 32, 33. The secondary valve means 14 are not affected by movement of the control lever from the position N to the position L in Fig. 13, and the brake mechanism 12 will therefore remain effective to restrain the driven shaft 85 of the auxiliary gearing against rotation. The controlled differential mechanism 6 is suitably constructed so that application of driving power to its drum or spider will cause unitary rotation of differential output shafts X and W shown in Figs. 2 and 3, while the driven shaft 85 of the auxiliary gearing is restrained against rotation. Such unitary rotation of the differential output shafts X and W will cause straight forward movement in low gear of the vehicle in which the power transmitting mechanism, as shown in Fig. 1, is installed.

Rearward adjustment of the hand lever 146 from the position N in Fig. 13 in the direction of line A—A to the position H causes forward movement of the rock shaft 151 to the position indicated in Fig. 9, with the result that the transmission clutch 8 establishes a high speed driving connection between the transmission input shaft 24 and the transmission output shaft 29, provided that the clutch collar 56 is engaged with the driven gear 41 of the high speed gear train, as has been explained hereinbefore. Under these conditions, the vehicle will advance in high gear while the output shaft 85 of the auxiliary gear is restrained against rotation by the brake mechanism 12.

From the position N, in Fig. 13, the hand lever 146 may be adjusted to the right in the direction of line D—D to the position indicated by the symbol $P_r$. Such adjustment of the hand lever causes anticlockwise rotation of the rock shaft 151 to its second rotatively adjusted position, as indicated in Fig. 10, and which, as has been explained hereinbefore, causes engagement of the left steering clutch 9 and release of the brake mechanism 12. As a result, rotation of the driving shaft 81 will be transmitted through the gear train 87, 88 to the output shaft 85 of the auxiliary gearing, the direction of rotation of the shaft 85 in this case being indicated by the arrow 104. Adjustment of the hand lever 146 from the position N to the position $P_r$, in Fig. 13, does not affect the axial position of the rock shaft 151 and the latter will therefore remain in the adjusted position indicated by Fig. 7 which corresponds to the neutral condition of the change speed transmission. The controlled differential mechanism 6 is suitably constructed so that rotation of the shaft 85 in the direction of arrow 104 will rotate the differential output shafts X and W at equal speeds in opposite directions to cause a pivot turn of the vehicle to the right while the drum or spider of the differential is at rest.

Similarly, a pivot turn of the vehicle to the left may be executed by moving the hand lever 146 from the position N to the position $P_l$, in Fig. 13.

It will be noted that such movement of the hand lever causes clockwise rotation of the rock shaft 151 to its third rotatively adjusted position indicated in Fig. 12, with the result that the steering clutch 11 is engaged and the brake mechanism 12 is released. The direction in which the shaft 85 rotates upon engagement of the steering clutch 11 is indicated by the arrow 106, in Fig. 3, and the controlled differential mechanism is so constructed as to effect a pivot turn of the vehicle to the left by rotation of the differential output shafts X and W in relatively opposite directions, when the shaft 85 is rotated in the direction of arrow 106 while the drum or spider of the differential is at rest.

The symbol $S_r$ in Fig. 13 indicates a position to which the hand lever 146 may be moved either by forward movement on line B—B from the position $P_r$, or by movement to the right on line E—E from the position L.

Assuming first that the lever is moved from the position $P_r$ to the position $S_r$, it will be noted by reference to Figs. 10 and 11, that such movement of the hand lever 146 causes engagement of the transmission clutch 7 while the steering clutch 9 is engaged. As a result, propelling power will be transmitted to the drum 6 of the differential through the low speed gear train 32, 33 while at the same time the shaft 81 of the auxiliary gearing is rotated in the direction of arrow 104. Under these conditions, that is, when the drum 6 is rotated by the low speed gear train 32 and 33 while the shaft 85 is rotated in the direction of arrow 104, the vehicle will execute a relatively sharp radius turn to the right. On the other hand, if hand lever 146 is moved from the position L in Fig. 13 to the position $S_r$, it will be noted by reference to Figs. 10 and 11 that the steering clutch 9 is engaged without causing disengagement of the transmission clutch 8, and that as a result the vehicle will start from straight forward movement in low gear to a relatively sharp radius turn to the right when the hand lever 146 is moved from the position L to the position $S_r$.

The foregoing explanations similarly apply to movement of the hand lever 146 from the position $P_l$ to the position $S_l$, and to movement of the hand lever 146 from the position L to the position $S_l$ in Fig. 13. Referring to Figs. 11 and 12, it will be noted that adjustment of the hand lever 146 from the position $P_l$ to the position $S_l$ causes engagement of the low speed transmission clutch 7 while the steering clutch 11 is engaged and the brake 12 is released, with the result that the vehicle will execute a relatively sharp radius turn to the left when the hand lever is moved from the position $P_l$ to the position $S_l$. On the other hand, if the hand lever is moved from the position L to the position $S_l$, the steering clutch 11 will be engaged while the low speed clutch 7 remains engaged, and as a result the vehicle will change from straight advanced movement in low gear into a relatively sharp radius turn to the left when the hand lever is moved from the position L to the position $S_l$.

The reference character H, in Fig. 13, designates a position to which the hand lever 146 may be moved in the direction of line A—A in order to establish the high speed drive of the transmission through the high speed gears 39 and 41 when the clutch collar 58 is engaged with the driven high speed gear 41, and to establish the reverse speed drive of the transmission through the gears 53, 54 and the reverse idler (not shown) when the clutch collar 56 is engaged with the driven reverse speed gear 54.

Referring to Figs. 8 and 9, it will be noted that when the hand lever 146 is in the position H, the transmission clutch 8 and the brake mechanism 12 are engaged and the transmission clutch 7 and both steering clutches 9 and 11 are disengaged, with the result that the vehicle will advance on a straight course in high gear or on a straight course in reverse, depending on the positioning of the clutch collar 56.

Further, referring to Figs. 9 and 10, it will be noted that when the hand lever is in the position $W_r$, the transmission clutch 8 and the steering clutch 9 are engaged and the transmission clutch 7, the steering clutch 11 and the brake mechanism 12 are disengaged, with the result that the vehicle will execute a relatively wide radius turn to the right, provided that the clutch collar 56 is engaged with the gear 41. On the other hand, if the clutch collar 56 is engaged with the reverse gear 54 and the hand lever is subsequently moved to the position $W_r$, the vehicle will execute a relatively sharp rearward radius turn to the left.

Further, referring to Figs. 9 and 12, it will be noted that when the hand lever 146 is in the position $W_l$, in Fig. 13, the transmission clutch 8 and the steering clutch 11 are engaged and the transmission clutch 7, the steering clutch 9 and the brake mechanism 12 are disengaged, with the result that the vehicle will execute a relatively wide radius turn to the left, provided that the clutch collar 56 is engaged with the high forward speed gear 41. On the other hand, if the clutch collar 56 is engaged with the reverse speed gear 54, subsequent adjustment of the hand lever 146 to the position $W_l$ in Fig. 13 will cause the vehicle to execute a relatively sharp rearward radius turn to the right.

The position $W_r$, in Fig. 13, may be reached by rearward adjustment of the hand lever from the position $P_r$ on line B—B, or by lateral adjustment of the hand lever on line F—F to the right from the position H. Similarly, the position $W_l$, in Fig. 13, may be reached by rearward movement of the hand lever on line C—C from the position $P_l$ or by lateral movement of the hand lever on line F—F to the left from the position H.

From the foregoing explanations it will be noted that the hydraulic system herein disclosed comprises a plurality of fluid motors, as represented by the single acting hydraulic jacks for the transmission clutches 7, 8, steering clutches 9, 11 and brake mechanism 12. Primary valve means 13, including the piston 57, are operatively associated with a first group of said fluid motors (7, 8) and are adapted to direct pressure fluid selectively to any one of said first group of fluid motors. Specifically, the primary valve means are selectively movable to a first, second and third adjusted condition, as schematically indicated in Figs. 7, 11 and 9, respectively. Secondary valve means 14, including the pistons 111 and 113, are operatively associated with a second group of said fluid motors (9, 11 and 12) and are adapted to direct pressure fluid selectively to any one of said second group of fluid motors. Specifically, the secondary valve means are selectively movable to a first, second and third adjusted condition, as schematically indicated in Figs. 8, 10 and 12, respectively.

The hydraulic system further comprises a control mechanism for the primary and secondary valve means 13, 14, the control mechanism being generally indicated by the reference character 16 in Fig. 1 and including a control element, represented by the rock shaft 151, which is mounted for translatory and rotary movement, the translatory movement being determined, in the illustrated embodiment of the invention, by shifting movement of the rock shaft 151 in the direction of its axis, and the rotary movement being determined by rotation of the rock shaft on its axis.

Further, in the illustrated embodiment of the invention, the control element is mounted for back and forth movement selectively within a first, second and third range, and for back and forth movement selectively within a fourth, fifth and sixth range. The mentioned first range of the control element is the axial range in which the rock shaft 151 moves in response to back and forth movement of the hand lever 146 on line A—A in Fig. 13, a corresponding line A—A being shown in Fig. 7, and the limits of the first range being indicated in the latter figure by the lines 203 and 204.

The second range of the control element is the axial range in which the rock shaft 151 moves in response to back and forth movement of the hand lever 146 on line B—B in Fig. 13, a corresponding line B—B being shown in Fig. 9, and the limits of the second range being indicated in the latter figure by the lines 203, 204.

The third range of the control element is the axial range in which the rock shaft 151 moves in response to back and forth movement of the hand lever 146 on line C—C in Fig. 13, a corresponding line C—C being shown in Fig. 11 and the limits of the third range being indicated in the latter figure by the lines 203, 204.

The fourth range of the control element is the angular range in which the rock shaft 151 moves in response to back and forth movement of the hand lever 146 on line D—D in Fig. 13, a corresponding line D—D being shown in Fig. 7, and the limits of the fourth range being indicated in Fig. 8 by the lines 206, 207.

The fifth range of the control element is the angular range in which the rock shaft 151 moves in response to back and forth movement of the hand lever 146 on line E—E in Fig. 13, a corresponding line E—E being shown in Fig. 11, and the limits of the fifth range being indicated in Fig. 12 by the lines 206, 207.

The sixth range of the control element is the angular range in which the rock shaft 151 moves in response to back and forth movement of the hand lever 146 on line F—F in Fig. 13, a corresponding line F—F being shown in Fig. 9, and the limits of the sixth range being indicated in Fig. 10 by the lines 206, 207.

The control element 151 is adjustable in any of its first, second and third ranges to a first, second and third predetermined position, as illustrated by Figs. 7, 11 and 9, respectively.

The first predetermined position of the control element 151 in its first range in the axial position in which it is shown in Fig. 7, and which corresponds to the position N of the hand lever in Fig. 13. The second predetermined position of the control element 151 in its first range is the axial position in which it is shown in Fig. 11 and which corresponds to the position L of the hand lever 146 in Fig. 13. The third predetermined position of the control element 151 in its first range is the axial position in which it is shown in Fig. 9 and which corresponds to the position H of the hand lever 146 in Fig. 13.

The first, second and third predetermined positions of the control element 151 in its second range are the axial positions thereof which correspond, respectively, to the position $P_r$, $S_r$ and $W_r$ of the hand lever 146 in Fig. 13.

The first, second and third predetermined positions of the control element in its third range are the axial positions thereof which correspond, respectively, to the positions $P_l$, $S_l$ and $W_l$ of the hand lever 146 in Fig. 13.

It will be noted that the first position of the control element 151 in each of its first, second and third ranges is an intermediate position, and that the second and third positions of the control element in each of its first, second and third ranges are first and second limit positions, respectively.

The control element 151 is further adjustable in any of its fourth, fifth and sixth ranges to a first, second and third predetermined position, as illustrated by Figs. 8, 10 and 12, respectively.

The first predetermined position of the control element 151 in its fourth range is the rotatively adjusted position in which it is shown in Fig. 8 and which corresponds to the position N of the hand lever in Fig. 13. The second predetermined position of the control element in its fourth range is the rotatively adjusted position in which it is shown on Fig. 10 and which corresponds to the position $P_r$ of the hand lever 146 in Fig. 13. The third predetermined position of the control element in its fourth range is the rotatively adjusted position in which it is shown in Fig. 12 and which corresponds to the position $P_l$ of the hand lever 146 in Fig. 13.

The first, second and third predetermined positions of the control element 151 in its fifth range are the rotatively adjusted positions thereof which correspond, respectively, to the positions L, $S_r$ and $S_l$ of the hand lever 146 in Fig. 13.

The first, second and third predetermined positions of the control element 151 in its sixth range are the rotatively adjusted positions thereof which correspond, respectively, to the positions H, $W_r$ and $W_l$ of the hand lever 146 in Fig. 13.

It will be noted that the first position of the control element 151 in each of its fourth, fifth and sixth ranges is an intermediate position, and that the second and third positions of the control element in each of its fourth, fifth and sixth ranges are first and second limit positions, respectively.

The system further comprises first actuating means connecting the control element 151 with the primary valve means 13. In the illustrated embodiment of the invention, the first actuating means include the ball head lever 159 and associated linkage 162, 166, 173, 181, 177 which are operative to move the primary valve means to first, second and third adjusted conditions in response to adjustment of the control element 151 to its first, second and third positions, respectively, in any of the first second and third ranges. The mentioned first, second and third adjusted conditions of the primary valve means are schematically shown in Figs. 7, 11 and 9, respectively. It will be noted that the first actuating means are inoperative to move the primary valve means upon movement of the control element 151 in any of its fourth, fifth and sixth ranges, such inoperativeness of the first actuating means being established, in the illustrated embodiment of the invention, by the rotatively loose connection between the rock shaft 151 and the first rocker 162.

The system further comprises second actuating means connecting the control element 151 with the secondary valve means 14. In the illustrated embodiment of the invention, the second actuating means include the arm 183 and associated linkage 188, 189 and 194, which are operative to move the secondary valve means to a first, second and third adjusted condition thereof in response to adjustment of the control element 151 to its first, second and third position, respectively, within any of said fourth, fifth and sixth ranges. The mentioned first, second and third adjusted conditions of the secondary valve means are schematically shown in Figs. 8, 10 and 12, respectively. It will be noted that the second actuating means are inoperative to move the secondary valve means upon movement of the control element 151 in any of said first, second and third ranges, such inoperativeness of the second actuating means being established, in the illustrated embodiment of the invention, by the axially loose connection between the rock shaft 151 and the arm 183.

Designating the valve pistons 57, 111 and 113 as first, second and third movable fluid control elements, respectively, it will be noted that the first fluid control element 57 is adapted to direct pressure fluid alternatively to first and second fluid motors, as represented by the hydraulic jacks of the transmission clutches 7 and 8, respectively; that the second fluid control element 111 is adapted to direct pressure fluid alternatively to third and fourth fluid motors, as represented by the hydraulic jacks of the steering clutches 9 and 11, respectively; and that the third fluid control element 113 is adapted to alternatively admit pressure fluid to and emit pressure fluid from a fifth fluid motor as represented by the hydraulic jack of the brake mechanism 12.

Further, designating the rocker 162 and the arm 183 as first and second actuating elements, it will be noted that one of said actuating elements, namely, the rocker 162 is operatively connected with said first fluid control element 57; that the other of said actuating elements, namely, the arm 183, is operatively connected with a rocker, namely, the rocker 189, and that reciprocable means, namely, the ball head 197 on the valve piston 111 and the link 194 are operable by the rocker 189 to move the second and third fluid control elements 111 and 113 relative to each other upon pivotal movement of the rocker 189.

In general terms, the ball head lever 159 and the first rocker 162 represent a pair of relatively movable motion transmitting elements which are connected, respectively, with the control element 151 and with one of the valve means 13, 14, one of said motion transmitting elements, namely, the ball head lever 159, being connected in rotatively and axially fixed relation with the control element 151 and having a slidable connection with the other of said motion transmitting elements, namely, the rocker 162, effective to accommodate rotary movement of the control element and to transmit axial shifting movement thereof to the other motion transmitting element.

The ball head on the lever 159 and the bifurcated arm of the rocker 162 form, in effect, a stud and slot connection between the lever 159 and the rocker 162, which is effective to transmit axial shifting movement of the control element 151 to the rocker 162, and which permits rotary movement of the control element 151 relative to the rocker 162. The axially elongated groove 184 of the shaft 151 and the key 186 form, in effect, a tongue and groove connection between the control shaft 151 and the valve actuating arm 183, which is operative to transmit rotary movement of the shaft 151 to said arm and which permits axial reciprocating movement of the shaft 151 relative to the arm 183.

It should be understood that it is not intended to limit the invention to the hereinabove described forms and details, and that the invention includes such other forms and modifications as are embraced by the scope of the appended claims.

It is claimed and desired to secure by Letters Patent:

1. A hydraulic system comprising, in combination, a plurality of fluid motors, primary valve means adapted to direct pressure fluid selectively to any one of a first group of said fluid motors, secondary valve means adapted to direct pressure fluid selectively to any one of a second group of said fluid motors, an axially shiftable rock shaft, a first movable actuating element, means connecting said rock shaft in shift transmitting and rotatable relation with said first actuating element, means operatively connecting said first actuating element in motion transmitting relation with one of said primary and secondary valve means, a second actuating element connected with said rock shaft in rotatively fixed and axially slidable relation thereto, and means operatively connecting said second actuating element in motion transmitting relation with the other of said primary and secondary valve means.

2. A hydraulic system as set forth in claim 1, in which said first group of fluid motors comprises two single acting hydraulic jacks and in which said primary valve means are constructed and arranged so as to emit fluid pressure from both of said jacks upon movement of said primary valve means to a first adjusted condition, and so as to admit fluid pressure to one and emit fluid pressure from the other of said jacks upon movement of said primary valve means to a second adjusted condition, and so as to admit fluid pressure to said other and emit fluid pressure from said one of said jacks upon movement of said primary valve means to a third adjusted condition.

3. A hydraulic system as set forth in claim 1, in which said second group of fluid motors comprises three single acting hydraulic jacks and in which said secondary valve means are constructed and arranged so as to emit fluid pressure from a first and a second of said jacks and to admit fluid pressure to the third of said jacks upon movement of said secondary valve means to a first adjusted condition, and so as to admit fluid pressure to said first and emit fluid pressure from said second and third jacks upon movement of said secondary valve means to a second adjusted condition, and so as to admit fluid pressure to said second and emit fluid pressure from said first and third jacks upon movement of said secondary valve means to a third adjusted condition.

4. A hydraulic system comprising, in combination, a plurality of fluid motors, primary valve means operatively associated with a first group of said fluid motors and selectively movable to a first, second and third adjusted condition, secondary valve means operatively associated with a second group of said fluid motors and selectively movable to a first, second and third adjusted condition; a control element mounted for back and forth movement selectively within a first, second and third range and for back and forth movement selectively in a fourth, fifth and sixth range, first actuating means connecting said control element with said primary valve means and operative to move said primary valve means to said first, second and third adjusted conditions thereof in response to adjustment of said control element to a first, second and third position, respectively, in any of said first, second and third ranges, said first actuating means being inoperative to move said primary valve means upon movement of said control element in any of said fourth, fifth and sixth ranges; and second actuating means connecting said control element with said secondary valve means, and operative to move said secondary valve means to said first, second and third adjusted condition thereof in response to adjustment of said control element to a first, second and third position, respectively, within any of said fourth, fifth and sixth ranges, said second actuating means being inoperative to move said secondary valve means upon movement of said control element in any of said first, second and third ranges.

5. A hydraulic system as set forth in claim 4, in which said control element is mounted for rotary movement on a predetermined axis and for shifting movement in the direction of said axis, said rotary movement permitting selective adjustment of said control element into any of said first, second and third ranges and also permitting back and forth movement of said control element in any of said fourth, fifth and sixth ranges, and said shifting movement permitting selective adjustment of said control element into any of said fourth, fifth and sixth ranges and also permitting back and forth movement of said control element in any of said first, second and third ranges.

6. A hydraulic system as set forth in claim 5, in which a pair of relatively movable motion transmitting elements are connected, respectively, with said control element and with one of said valve means, one of said motion transmitting elements being connected in rotatively and axially fixed relation with said control element and having a slidable connection with the other of said motion transmitting elements effective to accommodate rotary movement of said control element and to transmit axial shifting movement thereof to said other motion transmitting element, and in which motion transmitting means between said control element and the other of said valve means comprise an arm nonrotatably connected with said control element in axially slidable relation thereto.

7. A hydraulic system as set forth in claim 6, in which said relatively movable motion transmitting elements comprise a lever secured to said control element in axially and rotatively fixed relation thereto, a rocker pivoted on an axis extending transversely of and spaced from the axis of said control element, and a stud and slot connection between said lever and rocker effective to transmit axial shifting movement of said control element to said rocker and permitting rotary movement of said control element relative to said rocker.

8. A hydraulic system comprising, in combination, a pair of hydraulic jacks, primary valve means operatively associated with said jacks and selectively movable to a first adjusted condition permitting emission of fluid pressure from both of said jacks, or to a second adjusted condition permitting admission of fluid pressure to one and emission of fluid pressure from the other of said jacks, or to a third adjusted condition permitting emission of fluid pressure from said one and admission of fluid pressure to said other jack; a group of hydraulic fluid motors, secondary valve means operatively associated with said group of fluid motors and selectively movable to a first, second and third adjusted condition; a control element mounted for translatory back and forth movement selectively within a first, second and third range and for rotary back and forth movement selectively in a fourth, fifth and sixth range; first actuating means connecting said control element with said primary valve means and operative to move said primary valve means to said first, second and third adjusted conditions thereof in response to adjustment of said control element to a first, second and third position, respectively, in any of said first, second and third ranges, said first actuating means being inoperative to move said primary valve means upon movement of said control element in any of said fourth, fifth and sixth ranges; and second actuating means connecting said control element with said secondary valve means, and operative to move said secondary valve means to said first, second and third adjusted condition thereof in response to adjustment of said control element to a first, second and third position, respectively, within any of said fourth, fifth and sixth ranges, said secondary actuating means being inoperative to move said secondary valve means upon movement of said control element in any of said first, second and third ranges.

9. A hydraulic system comprising, in combination, a plurality of fluid motors, primary valve means operatively associated with said fluid motors and selectively movable to a first, second and third adjusted condition; three hydraulic jacks; secondary valve means operatively associated with said jacks and selectively movable to a first adjusted condition permitting emission of fluid pressure from a first and a second of said jacks and admission of fluid pressure to the third of said jacks, or to a second adjusted condition permitting admission of fluid pressure to said first jack and emission of fluid pressure from said second and third jacks, or to a third adjusted condition permitting admission of fluid pressure to said second jack and emission of fluid pressure from said first and third jacks; a control element mounted for translatory back and forth movement selectively within a first, second and third range and for rotary back and forth movement selectively in a fourth, fifth and sixth range; first actuating means connecting said control element with said primary valve means and operative to move said primary valve means to said first, second and third adjusted conditions thereof in response to adjustment of said control element to a first, second and third position, respectively, in any of said first, second and third ranges, said first actuating means being inoperative to move said primary valve means upon movement of said control element in any of said fourth, fifth and sixth ranges; and second actuating means connecting said control element with said secondary valve means, and operative to move said secondary valve means to said first, second and third adjusted condition thereof in response to adjustment of said control element to a first, second and third position, respectively, within any of said fourth, fifth and sixth ranges, said secondary actuating means being inoperative to move said secondary valve means upon movement of said control element in any of said first, second and third ranges.

10. A hydraulic system comprising, in combination, a first and a second single acting hydraulic jack, primary valve means operatively associated with said first and second jacks and selectively movable to a first adjusted condition permitting emission of fluid pressure from both of said jacks, or to a second adjusted condition permitting admission of fluid pressure to said first jack and emission of fluid pressure from said second jack, or to a third adjusted condition permitting admission of fluid pressure to said second jack and emission of fluid pressure from said first jack; a third and fourth single acting hydraulic jack; secondary valve means operatively associated with said third and fourth jacks and selectively movable to a first adjusted condition permitting emission of fluid pressure from said third and fourth jacks, or to a second adjusted condition permitting admission of fluid pressure to said third and emission of fluid pressure from said fourth jack, or to a third adjusted condition permitting admission of fluid pressure to said fourth and emission of fluid pressure from said third jack; a control element mounted for translatory back and forth movement selectively within a first, second and third range, and for rotary back and forth movement selectively in a fourth, fifth and sixth range; first actuating means connecting said control element with said primary valve means and operative to move said primary valve means to said first, second and third adjusted conditions thereof in response to adjustment of said control element to an intermediate position and to a first and a second limit position, respectively, in any of said first, second and third ranges, said first actuating means being inoperative to move said primary valve means upon movement of said control element in any of said fourth, fifth and sixth ranges; and second actuating means connecting said control element with said secondary valve means, and operative to move said secondary valve means to said first, second and third adjusted conditions thereof in response to adjustment of said control element to an intermediate position and to a first and a second limit position, respectively, in any of said fourth, fifth and sixth ranges, said second actuating means being inoperative to move said secondary valve means upon movement of said control element in any of said first, second and third ranges.

11. A hydraulic system comprising, in combination, a first and a second single acting hydraulic jack, primary valve means operatively associated with said first and second jacks and selectively movable to a first adjusted condition permitting emission of fluid pressure from both of said jacks, or to a second adjusted condition permitting admission of fluid pressure to said first jack and emission of fluid pressure from said second jack, or to a third adjusted condition permitting admission of fluid pressure to said second jack and emission of fluid pressure from said first jack; a third, a fourth and a fifth single acting hydraulic jack; secondary valve means operatively associated with said third, fourth and fifth jacks and selectively movable to a first adjusted condition permitting emission of fluid pressure from said third and fourth jacks and admission of fluid pressure to said fifth jack, or to a second adjusted condition permitting admission of fluid pressure to said third jack and emission of fluid pressure from said fourth and fifth jacks, or to a third adjusted condition permitting admission of fluid pressure to said fourth jack and emission of fluid pressure from said third and fifth jacks; a control element mounted for translatory back and forth movement selectively within a first, second and third range, and for rotary back and forth movement selectively in a fourth, fifth and sixth range; first actuating means connecting said control element with said primary valve means and operative to move said primary valve means to said first, second and third adjusted conditions thereof in response to adjustment of said control element to an intermediate position and to a first and a second limit position, respectively, in any of said first, second and third ranges, said first actuating means being inoperative to move said primary valve means upon movement of said control element in any of said fourth, fifth and sixth ranges; and second actuating means connecting said control element with said secondary valve means, and operative to move said secondary valve means to said first, second and third adjusted conditions thereof in response to adjustment of said control element to an intermediate position and to a first and a second limit position, respectively, in any of said fourth, fifth and sixth ranges, said second actuating means being inoperative to move said secondary valve means upon movement of said control element in any of said first, second and third ranges.

12. A hydraulic system comprising, in combination, a first and a second fluid motor, a first movable fluid control element adapted to direct pressure fluid alternatively to said first and second fluid motors, a third and a fourth fluid motor, a second fluid control element movable relative to said first fluid control element and adapted to direct pressure fluid alternatively to said third and fourth fluid motors, a fifth fluid motor, a third fluid control element adapted to alternatively admit pressure fluid to and emit pressure fluid from said fifth fluid motor, motion transmitting means interconnecting said second and third fluid control elements for movement in predetermined relation to each other, a motion control element mounted for back and forth movement in a first direction and for back and forth movement in a second direction transversely of said first direction, first actuating means connecting said motion control element with said first fluid control element and operative to move the latter upon back and forth movement of said motion control element in said first direction and inoperative to move said first fluid control element upon back and forth movement of said motion control element in said second direction, and second actuating means operatively connected with said motion control element and with said motion transmitting means and operative to move said second and third fluid control elements upon back and forth movement of said motion control element in said second direction and inoperative to move said second and third fluid control elements upon back and forth movement of said motion control element in said first direction.

13. A hydraulic system comprising, in combination, a first and a second fluid motor, a first movable fluid control element adapted to direct pressure fluid alternatively to said first and second fluid motors, a third and a fourth fluid motor, a second fluid control element movable relative to said first fluid control element and adapted to direct pressure fluid alternatively to said third and fourth fluid motors, a fifth fluid motor, a third fluid control element movable relative to said first and second fluid control elements and adapted to alternatively admit pressure fluid to and emit pressure fluid from said fifth fluid motor, an axially shiftable rock shaft, a first movable actuating element, means connecting said rock shaft in shift transmitting and rotatable relation with said first actuating element, a second actuating element connected with said rock shaft in rotatively fixed and axially slidable relation thereto, means operatively connecting one of said actuating elements with said first fluid control element, a rocker having a fixed pivot center and being operatively connected with the other of said actuating elements, and reciprocable means operable by said rocker to move said second and third fluid control elements relative to each other upon pivotal movement of said rocker.

14. A hydraulic system comprising, in combination, a first and a second fluid motor, a first movable fluid control element adapted to admit fluid pressure alternatively to said first and second fluid motors, a third and a fourth fluid motor, a second fluid control element movable relative to said first fluid control element and adapted to alternatively admit fluid pressure to said third and fourth fluid motors, a fifth fluid motor, a third fluid control element movable relative to said first and second fluid control elements and adapted to alternatively admit fluid pressure to and emit fluid pressure from said fifth fluid motor, an axially shiftable rock shaft, a first movable actuating element, means connecting said rock shaft in shift transmitting and rotatable relation with said first actuating element, means connecting said first actuating element in motion transmitting relation with said first fluid control element, a second actuating element connected with said rock shaft in rotatively fixed and axially slidable relation thereto, a rocker having a fixed pivot center and being operatively connected with said second actuating element, and reciprocable means operable by said rocker to move said second and third fluid control elements relative to each other upon pivotal movement of said rocker.

15. A hydraulic system comprising, in combination, a plurality of fluid motors, primary valve means adapted to direct pressure fluid selectively to any one of a first group of said fluid motors, secondary valve means adapted to direct pressure fluid selectively to any one of a second group of said fluid motors, an axially shiftable rock shaft, a first movable actuating element, means connecting said rock shaft in shift transmitting and rotatable relation with said first actuating element, means operatively connecting said first actuating element in motion transmitting relation with one of said primary and secondary valve means, a second actuating element connected with said rock shaft in rotatively fixed and axially slidable relation thereto, means operatively connecting said second actuating element in motion transmitting relation with the other of said primary and secondary valve means, a hand lever mounted for universal movement about a fixed pivot center, and means universally connecting said hand lever with said rock shaft so that the latter will be moved axially in opposite directions upon back and forth swinging movement of said hand lever longitudinally of said rock shaft, and so that said rock shaft will be rotated about its axis in opposite directions upon back and forth swinging movement of said hand lever transversely of said rock shaft.

16. A motion transmitting mechanism comprising, in combination, a support, a rock shaft mounted on said support for rotary and axial shifting movement relative thereto, a first rocker mounted on said support for pivotal movement on an axis extending transversely of and spaced from the axis of said rock shaft, connecting means between said rock shaft and said first rocker operative to transmit shifting movement of said rock shaft to said rocker and permitting rotary movement of said rock shaft relative to said first rocker, a second rocker mounted on said support for pivotal movement on an axis extending transversely of the pivot axis of said first rocker, link means operatively interconnecting said first and second rockers, an arm retained on said support against movement in the axial direction of said rock shaft and connected with the latter for rotation therewith and for axial movement of said rock shaft relative thereto, another rocker mounted on said housing for pivotal movement on an axis extending parallel to said rock shaft, and means operatively connecting said other rocker with said arm.

17. A motion transmitting mechanism comprising, in combination, a support, a rock shaft mounted on said support for rotary and axial shifting movement relative thereto, a first rocker mounted on said support for pivotal movement on an axis extending transversely of and spaced from the axis of said rock shaft, connecting means between said rock shaft and said first rocker operative to transmit shifting movement of said rock shaft to said rocker and permitting rotary movement of said rock shaft relative to said first rocker, a second rocker mounted on said support for pivotal movement on an axis extending transversely of the pivot axis of said first rocker, link means operatively interconnecting said first and second rockers, a third rocker mounted on said support for pivotal movement on an axis extending parallel to the axis of said second rocker, other link means operatively interconnecting said second and third rockers, an arm retained on said support against movement in the axial direction of said rock shaft and connected with the latter for rotation therewith and for axial movement of said rock shaft relative thereto, another rocker mounted on said support for pivotal movement on an axis extending parallel to said rock shaft, and means operatively connecting said other rocker with said arm.

18. A motion transmitting mechanism comprising, in combination, a support having a pair of bearing lugs aligned on a common axis and spaced from each other in the direction of said axis, a rock shaft mounted intermediate its ends in said bearing lugs for rotation on said axis and for axial back and forth movement relative to said support, an actuating arm extending radially of and secured for rotation and axial shifting movement in unison with said rock shaft at the axially outer side of one of the bearing lugs, a rocker mounted on said support for pivotal movement on an axis extending transversely of and spaced from the axis of said rock shaft, connecting means between said actuating arm and said rocker operative to transmit axial shifting movement of said rock shaft to said rocker and permitting rotary movement of said rock shaft relative to said rocker, another actuating arm extending radially of said rock shaft and having a hub member in the space between the axially inner sides of said bearing lugs, and means connecting said rock shaft in relatively axially shiftable and rotatively fixed relation with said hub member of said other actuating arm.

19. A motion transmitting mechanism as set forth in claim 18, and further comprising a control lever mounted for universal movement about a fixed pivot center on said support, and means at the axially outer side of the other of said bearing lugs universally connecting one end of said control lever with said rock shaft so that back and forth swinging movement of said control lever in the longitudinal direction of said rock shaft will shift the latter in axially opposite directions, and so that back and forth swinging movement of said control lever transversely of said rock shaft will rotate the latter in opposite directions.

EMIL F. NORELIUS.
MICHAEL TOTH.
DAVID RINKEMA.

References Cited in the file of this patent

UNITED STATES PATENTS

| Number | Name | Date |
| --- | --- | --- |
| 514,550 | Hill | Feb. 13, 1894 |
| 1,091,160 | Phillips | Mar. 24, 1914 |
| 1,400,110 | Warner | Dec. 13, 1921 |
| 1,452,296 | Howard | Apr. 17, 1923 |
| 1,487,445 | Dickinson | Mar. 18, 1924 |
| 1,541,712 | Horn | June 9, 1925 |
| 1,711,896 | McLean | May 7, 1929 |
| 2,207,797 | Guier | July 16, 1940 |
| 2,244,471 | Nichols | June 3, 1941 |
| 2,382,323 | Lornitzo | Aug. 14, 1945 |
| 2,410,965 | Dimick | Nov. 12, 1946 |
| 2,520,734 | Price | Aug. 29, 1950 |

FOREIGN PATENTS

| Number | Country | Date |
| --- | --- | --- |
| 22,417 | Great Britain | Oct. 2, 1912 |